United States Patent
Yoshida et al.

(10) Patent No.: US 6,989,420 B2
(45) Date of Patent: Jan. 24, 2006

(54) COATING LIQUID FOR PRODUCING INSULATING FILM HAVING LOW DIELECTRIC CONSTANT

(75) Inventors: Yuji Yoshida, Edogawa-ku (JP); Naoya Satoh, Tsukuba (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/302,946

(22) Filed: Nov. 25, 2002

(65) Prior Publication Data

US 2003/0130391 A1 Jul. 10, 2003

(30) Foreign Application Priority Data

Nov. 30, 2001 (JP) .................. 2001-366244

(51) Int. Cl.
*C08L 71/12* (2006.01)

(52) U.S. Cl. .................. 525/106; 524/366; 524/476; 428/447; 528/169

(58) Field of Classification Search ............... 525/106; 524/366, 476; 428/447; 528/169
See application file for complete search history.

(56) References Cited

U.S. PATENT DOCUMENTS 5,998,522 A * 12/1999 Nakano et al. ............. 524/315
6,124,421 A * 9/2000 Lau et al. .................. 528/169
6,291,628 B1 * 9/2001 Chen et al. ................. 528/169
6,492,443 B1 * 12/2002 Kodemura et al. ......... 524/114
6,534,595 B2 * 3/2003 Yoshida et al. ............. 525/106
6,562,465 B1 * 5/2003 Nakashima et al. ........ 428/412
6,586,104 B2 * 7/2003 Matsuda et al. ............ 428/447

FOREIGN PATENT DOCUMENTS

| JP | 06-206985 A | 7/1994 |
| JP | 2000-133648 A | 5/2000 |
| JP | 2000-186140 A | 7/2000 |
| JP | 2000-256550 A | 9/2000 |

OTHER PUBLICATIONS

D.J. Dawson et al., "Thermally Stable Polymers for Electronic Applications", ACS Symp. Series, 282, 1985, pp. 63–79.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

Coating liquid for producing insulating film having low dielectric constant is provided. It was achieved by coating liquid for producing insulating film having low dielectric constant comprising a thermosetting resin having carbon-carbon unsaturated bond, an organic solvent, and less than two molecular equivalents of water to the carbon-carbon unsaturated bond.

10 Claims, No Drawings

COATING LIQUID FOR PRODUCING INSULATING FILM HAVING LOW DIELECTRIC CONSTANT

FIELD OF THE INVENTION

The present invention relates to a coating liquid for producing insulating film having low dielectric constant.

BACKGROUND OF THE INVENTION

Improvement in the speed of LSI (Large Scale Integrated Circuit) is usually attained by miniaturizing transistor which constitutes LSI.

In recent years, however, this miniaturization result in narrowing intervals between wirings, and retardation (wiring retardation) of a signal transfer or cross talk between adjacent wirings has become remarkable. Accordingly, these problems hinder making LSI high-performance.

Lowering the dielectric constant of the insulating film filling between wirings is examined as one of the ways to solve this problem. In order to lower the dielectric constant, the thermosetting resins, such as an epoxy resin has attracted attention, because these resins have carbon-carbon unsaturated bond as a reaction group which does not generate the high polar functional group during hardening stage.

However, insulating film obtained from the coating liquid containing the thermosetting resin having carbon-carbon unsaturated bond as a reaction group has not provided sufficiently and stably a insulating film having low dielectric constant.

The object of the present invention is to provide a coating liquid for producing insulating film having low dielectric constant and capable to generate a stable electrical property of electric device such as transistor.

SUMMARY OF THE INVENTION

The inventors of the present invention have made an intensive and continuous study in order to find out a coating liquid for producing insulating film having low dielectric constant without above problems, and, as a result, have found that, a low dielectric constant of insulating film can be stably attained by controlling a water content to be less than two molar equivalents to carbon-carbon unsaturated bond of a thermosetting resin.

Accordingly, the present invention provide a coating liquid for producing insulating film having low dielectric constant comprising a thermosetting resin having carbon-carbon unsaturated bond, an organic solvent, and less than two molar equivalents of water to the carbon-carbon unsaturated bond.

DETAILED DESCRIPTION OF THE INVENTION

The present invention is explained in detail as follows.

A thermosetting resin having carbon-carbon unsaturated bond used for the present invention is not limited, and the carbon-carbon unsaturated bond may exist in any of the main chain of a resin, the end of main chain, or a side chain.

As an example of the above thermosetting resin, a resin having a structure represented by formula (1) and/or a formula (2) in a main chain may be illustrated.

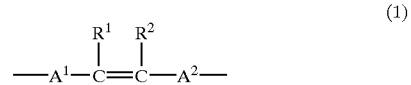

(wherein $A^1$ and $A^2$ represent a divalent organic group, and $R^1$ and $R^2$ represent a hydrogen atom, hydrocarbon group of 1 to 4 carbon atoms, or aryl group which may be substituted.)

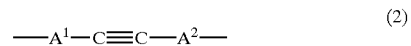

(wherein $A^1$ and $A^2$ represent the same as above formula (1).)

A divalent organic group may include, for example, the alkylene group of 1 to 20 carbon atoms, a cycloalkylene group, a phenylene group, a biphenylene group, a terphenylene group, a naphthylene group, a anthracenylene group, an oxy-phenylene group, and these divalent organic groups may be substituted by, for example, a fluorine atom, the chlorine atom, the bromine atom, the iodine atom, the hydroxyl group and so on.

A hydrocarbon group of 1 to 4 carbon atoms may include, for example, a methyl group, an ethyl group, a butyl, sec-butyl, and tert-butyl.

An aryl group which may be substituted may include, for example, phenyl group, naphthyl group, biphenyl group, methylphenyl group, ethylphenyl group, butylphenyl group, dimethylphenyl group, a trimethylphenyl group, methylnaphthyl group, ethylnaphthyl group, butylnaphthyl group.

A resin having a structure represented by above formula (1) or above formula (2) in a main chain may include, for example, norbornene polymer represented by formula (3), which has carbon-carbon double bond in its main chain, disclosed in JP No.6-206985A,

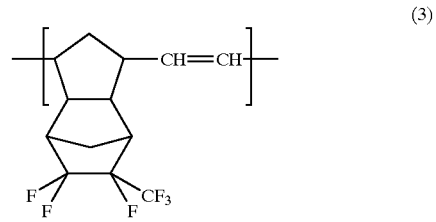

polyarylene ether represented by formula (4), which has carbon-carbon triple bond in its main chain, disclosed in JP2000-186140A,

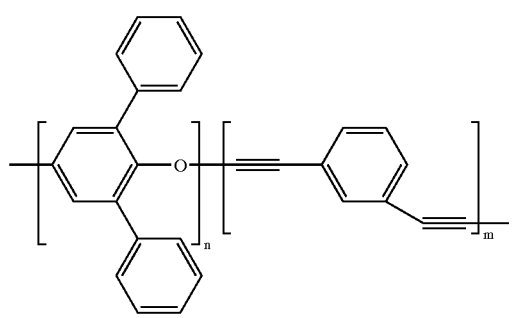

polyarylene ether represented by formula (5), which has carbon-carbon triple bond in its main chain, disclosed in U.S. Pat. No. 6,124,421,

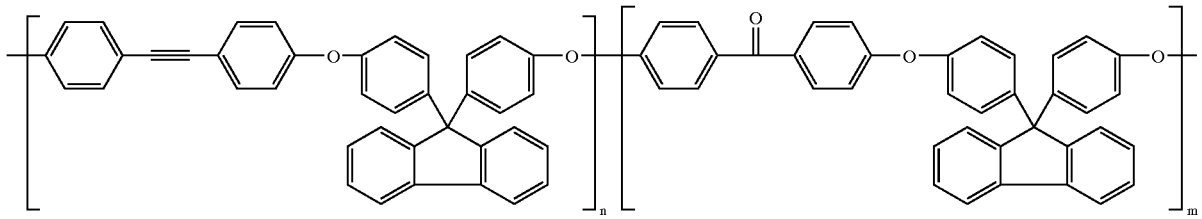

polyphenylene represented by formula (6), which has carbon-carbon triple bond in its main chain, described in ACS Symp. Series 282, p63, (1985).

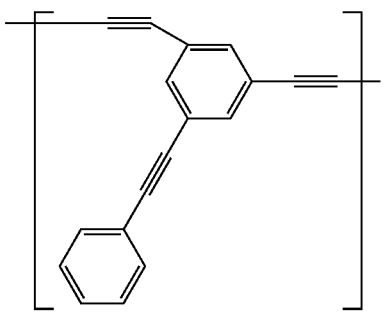

Resins described above have carbon-carbon unsaturated bond as represented by formula (3)–(6) and are heat curable polymer by addition reaction of the carbon-carbon unsaturated bonds.

A resin having carbon-carbon unsaturated bond in the end of main chain or side chain may include, for example, a resin obtained by bonding a group represented by formula (7) and/or (8) directly or through linkage group to the main chain of the resin.

(wherein $R^3$, $R^4$, and $R^5$ represent a hydrogen atom, hydrocarbon group of 1 to 4 carbon atoms or aryl group which may be substituted.)

(wherein $R^6$ represent a hydrogen atom, hydrocarbon group of 1 to 4 carbon atoms or aryl group which may be substituted.)

Hydrocarbon group of 1 to 4 carbon atoms and the aryl group which may be substituted are the same as the above.

When a resin is obtained by bonding a group represented by formula (7) and/or (8) to the main chain through linkage group, a linkage group may include, for example, an oxygen atom, a sulfur atom, alkylene group of 1–6 carbon atoms, and the arylene group which may be substituted, and a silyl group.

Preferable examples containing groups represented by formula (7) may include, for example, a vinyl group, an allyl group, 1-propenyl group, butenyl group, divinylmethyl group, diallylmethyl group, butenylmethyl group, divinylethyl group, diallylethyl group, dibutenylethyl group, 2-methylethylyl group, 2-ethylethylyl group, 2-phenylethylyl group, 2-methyl-2-propenyl group, 2,2-diphenylethylyl group, stylyl group, naphthalene vinylene group, toluylene vinylene group, vinyloxy group, allyloxy group, 1-propenyloxy group, butenyloxy group, divinylmethyloxy group, diallylmethyloxy group, dibutenylmethyloxy group, divinylethyloxy group, diallylethyloxy group, vinyloxy group, allyloxy group, 1-propenyloxy group, butenyloxy group, vinylthio group, allylthio group, 1-propenylthio group, butenylthio group, vinyldimethylsilyl group, vinyldiethylsilyl group, vinyldipropylsilyl group, vinyldiphenylsilyl group, vinyldinaphthylsilyl group, vinylmethylnaphthylsilyl group, vinyldimethylsilyl group, vinyldiethylsilyl group, vinyldipropylsilyl group, vinyldiphenylsilyl group, divinylmethylsilyl group, divinylethylsilyl group, divinylpropylsilyl group, divinylphenylsilyl group, allyldimethylsilyl group, allyldiethylsilyl group, allyldipropylsilyl group, allyldiphenylsilyl group, allyldinaphthylsilyl group, allylmethylnaphthylsilyl group, allyldimethylsilyl group, diallylmethylsilyl group, diallylethylsilyl group, diallylpropylsilyl group, diallylphenylsilyl group, butenyldimethylsilyl group, butenyldiethylsilyl group, trivinylsilyl group, triallylsilyl group, tributenylsilyl group, vinyldiallylsilyl group, divinylallylsilyl group.

Preferable examples containing groups represented by formula (8) may include, for example, ethynyl group, propargyl group, propinyl group, butynyl group, pentynyl group, phenylethynyl group, naphthylethynyl group, toluylethynyl group, ethynyloxy group, propinyloxy group, butynyloxy group, phenylethynyloxy group, naphthylethynyloxy group, ethynylthio group, propinylthio group, butynylthio group, phenylethynylthio group, naphthylethynylthio group, ethynyldimethylsilyl group, ethynyldiethylsilyl group, ethynyldipropylsilyl group, ethynyldiphenylsilyl group, ethynyldinaphthylsilyl group, ethynylmethylnaphthylsilyl group, diethynylmethylsilyl group, diethynylethylsilyl group, diethynylpropylsilyl group, diethynylphenylsilyl group, propinyldimethylsilyl group, propinyldiethysilyl group, propinyldipropylsilyl group, propinyldiphenylsilyl group, propinyldinaphthylsilyl group, propinylmethylnaphthylsilyl group, a propinyldimethylsilyl group, propinyldiethysilyl group, propinyldipropylsilyl group, propinyldiphenylsilyl group, dipropinylmethylsilyl group, dipropinylethylsilyl group, dipropinylpropylsilyl group, dipropinylphenylsilyl group, butynyldimethylsilyl group, butynyldiethylsilyl group, triethynylsilyl group, tripropinylsilyl group, tributynylsilyl group.

A thermosetting resin having the group represented by formula (7) or formula (8) in the end of its main chain may include, for example, fluorinated polyaryleneether represented by formula (9) disclosed in JP 2000-No. 256550A.

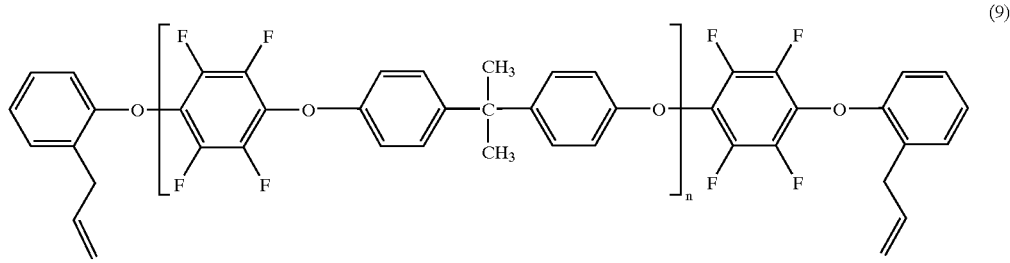

(9)

A thermosetting resin having the group represented by formula (3) and (4) in its side chain may include, for example, polyphnylene ether containing allyl group represented by formula (10) disclosed in JP 2000-No. 133648A,

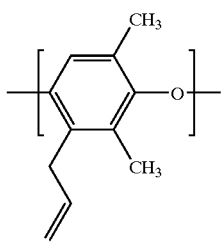

(10)

and polyphnylene ether containing propargyl group represented by formula (11) disclosed in JP 01-113425A.

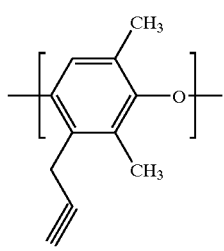

(11)

These resins are heat curable by addition reaction of the carbon-carbon unsaturated bonds bonded to the end of main chain or the side chain.

The content of carbon-carbon unsaturated bond in resin can be determined by the following method;

1. $^1$H-NMR method in case where hydrogen exist on the carbon of carbon-carbon unsaturated group, 2. the method of analyzing directly resin by reacting bromine with the carbon-carbon unsaturated bond and then determining amount of residual bromine such as bromine-tetrachloride method, bromide-bromic acid method and the tribromo potassium method (described in "Practice of Quantitative Analysis of Organic Compound. Classified by Functional Group" authored by F. T. Weiss and translated by Akira Ejima, Hirokawa Shoten, 1974) in other case than above, and 3. the method of determining the amount of residual reaction agent in the reaction system after producing resin.

The thermosetting resin having carbon-carbon unsaturated bond can be cured by the three-dimensional bridge occurred by heating or optical irradiation, and it is preferable to cure by heat-bridging from the viewpoint of reducing permittivity.

Heat bridging is carried out for 1 minute to 5 hours preferably at 200° C. or more, more preferably 250° C. or more. The thermosetting resin thus obtained preferably has the heat-resisting property of 200° C. or more, and, more preferably, the temperature of 1% weight loss determined by thermogravimetric analysis is not less than 200° C., and more preferably, not less than 300° C. In the case where the thermosetting resin is used for insulating film of Si device, the temperature of 1% weight loss of not less than 350° C. is preferable.

A thermosetting resin having an aromatic ring in a main chain is preferable. Resin having a carbon-carbon unsaturated bond in a main chain can be manufactured by polymerizing directly the aromatic compound which has two or more halogen groups in a molecule, and the aromatic compound which has two or more vinyl group, allyl group, ethynyl group, etc. in a molecule via Heck reaction or Sonogashira reaction.

Resin having a carbon-carbon unsaturated bond in the end of main chain or side chain can be manufactured by introducing the unsaturated group into the resin by reacting resin of which aromatic ring is activated by metalizing with lithium, a methyllithium, a n-butyllithium, sodium, etc. with the halide compound having a carbon-carbon unsaturated group.

Moreover, thermosetting resin having ether group is preferable besides carbon-carbon unsaturated bond.

Since the thermosetting resin which has ether group is excellent in the adhesion to silicone, oxidation silicone, glass, aluminium, titanium, titanium oxide, titanium nitride, tantalum, tantalum oxide, tantalum nitride, tungsten, tungsten oxide, tungsten nitride, copper, copper oxide, etc., such resin is preferable.

The weight average molecular weight of thermosetting resin can be measured as weight average molecular weight converted into polystyrene molecular weight by GPC analysis. The weight average molecular weight is preferably from 1000 to 100000, and more preferably from 2000 to 50000. In the case of less than 1000, the mechanical strength of the obtained insulated film may be deteriorated, and in case of exceeding 100000, coating property of the obtained coating liquid may not be sufficiently good and curing reaction may hardly occur.

The organic solvent used for this invention is not particularly limited and may be preferably used as far as the solvent can be dehydrated by the conventional method.

Solvents which is commercially available may be preferable and include, for example, alcoholic solvents such as methanol, ethanol, isopropanol, 1-butanol, 2-ethoxymethanol and 3-methoxypropanol, ketone solvents such as acetylacetone, methyl ethyl ketone, methyl isobutyl ketone, 3-pentanone, 2-heptanone, 3-heptanone, and cyclohexanone, ester solvents such as propyl acetate, butyl acetate, isobutyl acetate, pentyl acetate, methyl propionate, ethyl propionate, methyl butyrate, propylene-glycol-monomethyl-ether acetate and ethyl lactate, ether solvents such as a diisopropyl ether, dibutyl ether, dioxane, anisole, phenetole, veratrole, and diphenyl ether, aromatic-hydrocarbon solvents, such as mesitylene and ethylbenzene, solvents containing halogen atom such as chloroform, chlorobenzene, dichloroethylene, and trichloroethylene, hydrocarbon solvents such as pentane, hexane, heptane, and cyclohexane, and mixture thereof.

Moreover, since mixture of organic solvents containing at least one kind of solvent having 100° C. or more of boiling point is excellent in coating property at the time of coating, and the insulating film obtained by such mixture of solvents has not uniformity of thickness such as a striation (it means difference of thickness between the central part and the periphery section of wafer occurred sometimes when using the method of a spin coat) to produce excellent in evenness of the film, such mixture of organic solvents is used preferably.

Among above solvents, ketone solevents, ester solvents, ether solvents and aromatic hydrocarbon solvents are preferably used because these are superior in solubility to resin, and water contained in these solvents can be removed by azeotropic dehydration.

The methods for preparing coating liquid are illustrated as follows.

(1). The method for preparing coating liquid by dehydrating the reaction liquid which is obtained after completion of polymerization reaction (2). The method for preparing coating liquid by dehydrating liquid obtained by replacing directly the solvent used for polymerization reaction with solvent used for coating liquid after completion of polymerization reaction.

(3). The method for preparing coating liquid by dissolving the polymer, which is recovered from the reaction liquid by separating solid-liquid phase separation after completion of polymerization reaction and dried up, into the dehydrated solvent used for coating liquid.

In the present invention, the water content in thermosetting resin is necessary to adjust to less than two molar equivalents to carbon-carbon unsaturated bond. The water content is preferably from 0.01 to 1.99 molar equivalents, more preferably from 0.05 to 1.5 molar equivalents. If the water content is over 1.99 molar equivalent, dielectric constant may sometime be deteriorated, and if the water content is less than 0.01, production process may be complicated.

In the above methods (1) and (2), the amount of resin and water content in a coating liquid are measured, and coating liquid is dehydrated by an azeotropic dehydration or using dehydrating agent so that the water content should be less than two molar equivalent to the carbon-carbon unsaturated bond of the resin.

Although conducting conditions of azeotropic dehydration varies with the kind of used solvent or water content before dehydration, in the case of, for example, using the solvent of the reagent grade containing about 0.5% by weight of water, water can be suppressed to less than two molar equivalents by removing 5 to 10% by weight of the solvent as an initial distillate by atmospheric distillation or vacuum distillation.

When using dehydrating agent, the method may include that the method comprises a step of mixing from 1 to 50% by weight of dehydrating agent such as calcium carbonate, magnesium carbonate, sodium sulfate, magnesium sulfate, calcium chloride, a molecular sieve and zeolite with organic solvent, a step of agitating the resulted mixture for 1 minute to 5 hours, and a step of separating the dehydration agent from the mixture by solid-liquid phase separation, or the method comprises a step of filling a column with the dehydrating agent same as above and step of dipping organic solvent in the column.

Since the water content can be measured by the Karl Fischer method or the gas chromatography, the water content can be controlled to less than two molar equivalents to carbon-carbon unsaturated bond in a resin by adjusting the resin content and water content in coating liquid.

The above method (3) is a method of dehydrating a resin, organic solvent and additives, if added, respectively. Although the dehydration method is not particularly limited, in the case of dehydrating resin, for example, it can be dehydrated by drying under the reduced pressure at the temperature from room temperature to 100° C. and under the pressure of not more than 100 mmHg. The conditions for drying are suitably chosen according to resin used.

Additives described later can also be dehydrated under similar conditions to the conditions for resin, and the conditions where decomposition and degradation of additives do not occur should be suitably selected.

Regarding dehydration of solvent, it can be dehydrated by the method described in references such as "Solvent Handbook" (edited by Teruzou Asahara et. al. Koudansha Ltd.). The dehydration method may include, for example, the method of contacting solvent with dehydrating agent such as sodium sulfate, magnesium sulfate, calcium chloride, metallic sodium and a molecular sieve, and the method of dehydrating by precision distillation.

The target water content is preliminary determined according to the kind of the resin and additive to mix and the ratio of mixture, and the water content in coating liquid to the carbon-carbon unsaturated bond of the resin is controlled to be less than two molar equivalent.

Among above three methods, the method (3) is preferable in the present invention.

The resin content in a coating liquid is preferably from 5% by weight to 40% by weight.

In case where the resin content in a coating liquid is less than 5% by weight, the thickness of the formed coating film may be tend to become thin and it may be required to apply a coating liquid on the formed film for several times. Therefore, there may be a tendency for working efficiency to be deteriorated. On the other hand, in case where the resin content exceeds 40% by weight, the viscosity of the coating liquid may become so high that pressure loss of the pump used for sending coating liquid may be larger.

To the coating liquid of the present invention, additives may be add. Such additives may include, for example, surface active agents, metal coupling agents, a thickeners. Moreover, in order to inhibit water in air from getting mixed, acetal such as acetonedimethylacetal and cyclohexanonedimethylacetal, may also be added as water scavenger.

Furthermore, in order to make the insulated film porous and low dielectric constant, foaming agent may be added to a coating liquid.

EXAMPLE

The present invention is explained with reference to the following Examples, which are not intended to limit the scope of the present invention.

Production Example 1

In a 2 litter-volume 4 necked flask, 172.8 g of 1,1-bis(4-hydroxy-3-cyclohexylphenyl)cyclohexylidene, 33 g of caustic soda, 560 g benzophenone and 300 g of toluene were placed and refluxed dehydration was conducted. After dehydration was completed, 162.4 g of diiodobiphenyl was added. Then, the solution dissolved 0.4 g of cuprous chlorides in 40 g of pyridine was added to the above mixture, and the reaction was conducted at 185° C. of the inner temperature for 6 hours.

After cooling it to room temperature, the obtained reaction solution was added to the solution of 80 g of acetic acid dissolved into 3 kg of isopropyl alcohol to deposit the product. The crystal thus precipitated was filtered, washed with a large amount of methanol, and the aromatic polyether was obtained.

The weight average molecular weight of the aromatic polyether was 4000 as a weight average molecular weight converted into polystyrene molecular weight.

To the 200 milliliter-volume four necked flask purged with nitrogen, 4 g of 15 aromatic polyether obtained above and 40 g for THF as solvent was added, and the aromatic polyether resin was dissolved. To this solution, 23 ml of n-butyllithium solution (1.6M n-hexane solution) is added and stirred under the nitrogen stream for 1 hour, after then, 4.9 g of vinyl dimethylsilyl chloride was added to the solution and the resulted solution was further stirred for about 2 hours.

After the reaction was completed, the reaction liquid was charged into the mixed solvent of 1000 g of methanol and 20 g of acetic acid, and a resin having high molecular weight is precipitated, filtrated and washed with methanol. The solid thus obtained was dried at 50° C. under reduced pressure for one night to obtain white powdered polymer.

The determination of the amount of vinyldimethylsilyl group in the resin by $^1$H-NMR revealed that there was one equivalent of vinyldimethylsilyl group per 667 g of the resin.

The weight average molecular weight calculated by GPC (HLC8120 type manufactured by TOSOH Corporation) was about 4000 as converted into polystyrene molecular weight, and the temperature of 1% weight loss determined by thermogravimetric analysis (DTA-60 manufactured by Shimadzu Corporation) was 460° C.

Example 1

To 2-heptanone, 10% by weight of molecular sieve 4A1/8 (manufactured by Wako Chemical Co. Ltd.) was added. After 1 hour stirring, vacuum distillation was carried out to distil off 5% by weight of the used 2-heptanone, and then, 70% by weight of the used 2-heptanone was obtained as dehydrated-distilled 2-heptanone. The water content measured by the Karl Fischer method was 0.01% by weight.

The resin obtained by above Production Example 1 was dissolved to the dehydrated-distilled 2-heptanone above obtained so that the solid content of the resin was 15%, and coating liquid was prepared.

The measurement of the water content of the coating liquid by Karl Fischer moisture meter (AQ-6 manufactured by Hiranuma) revealed that it was 0.2% by weight and was 0.5 molar equivalents to the vinyldimethylsilyl group in the resin.

The coating liquid thus prepared was filtered by 0.2 μm PTFE filter and a spin coat is carried out to 4 inch silicon wafer by 2000 rpm of rotational frequency. And then, the spin coated silicon wafer was baked for 1 minutes at 150° C. and was conducted heat-treatment at 400° C. for 30 minutes under nitrogen atmosphere to obtain insulating film.

C-V measurement of the above insulating film at the frequency of 1 MHz by mercury probe method (measured by SSM495 type manufactured by S. S. M. Corporation) revealed that its dielectric constant was 2.57.

Comparative Example 1

The resin obtained by above Production Example 1 was dissolved to 2-heptanone so that the solid content of the resin was 7%, and coating liquid was prepared.

The Water content of the coating liquid was 0.4% by weight and was 2.1 molar equivalents to the vinyldimethylsilyl group in a resin.

Insulating film was obtained and measured its dielectric constant by in the same manner as in Example 1. The measured dielectric constant was 2.67.

Comparative Example 2

Insulating film was obtained in the same manner as in Example 1 except that ion exchange water was added by micro syringe to the coating liquid prepared by Example 1 so that the water content of the coating liquid was 0.8% by weight and 2.0 molar equivalents to the vinyldimethylsilyl group in a resin. Insulating film was measured its dielectric constant by in the same manner as in Example 1. The measured dielectric constant was 2.63.

According to the present invention, coating liquid for producing insulating film having low dielectric constant can be provided.

What is claimed is:

1. A method of making a coating liquid for producing insulating film having a low dielectric constant comprising dissolving a thermosetting resin having curable carbon-carbon unsaturated bonds in an organic solvent and adjusting the water content to from 0.01 to less than two molar equivalents of water per curable carbon-carbon unsaturated bond.

2. The method according to claim 1, wherein the thermosetting resin has from 1000 to 100000 of weight average molecular weight as converted into molecular weight of polystyrene measured by GPC.

3. The method according to claim 1, wherein the temperature of 1% weight loss of the thermosetting resin determined by thermogravimetric analysis is not less than 200° C.

4. The method according to claim 1, wherein the thermosetting resin is a resin having an aromatic ring in a main chain.

5. The method according to claim 1, wherein the thermosetting resin is a resin having an ether linkage in a main chain.

6. The method according to claim 1, wherein the organic solvent is at least one solvent selected from the group consisting of a ketone solvent, an ester solvent, an ether solvent, and an aromatic hydrocarbon solvent.

7. The method according to claim 1, wherein the concentration of solid content in the coating liquid is from 5% by weight to 40% by weight.

8. The method according to claim 1, wherein the water content is from 0.01 to 1.99 molar equivalents of water per curable carbon-carbon unsaturated bond.

9. The method according to claim 1, wherein the thermosetting resin having the curable carbon-carbon unsaturated bonds is cured.

10. The method according to claim 1, further comprising surface active agents, metal coupling agents or thickeners.

* * * * *